United States Patent [19]

Wakabayashi et al.

[11] Patent Number: 4,874,483

[45] Date of Patent: Oct. 17, 1989

[54] PROCESS FOR THE PREPARATION OF REDOX BATTERY ELECTROLYTE AND RECOVERY OF LEAD CHLORIDE

[75] Inventors: Ataru Wakabayashi; Yohichi Umehara, both of Yokohama; Satsuki Morie; Ikuro Kuwahara, both of Kawasaki; Yoshimi Okada, Yokohama, all of Japan

[73] Assignee: Chiyoda Corporation, Japan

[21] Appl. No.: 304,265

[22] Filed: Jan. 31, 1989

[30] Foreign Application Priority Data

Feb. 4, 1988 [JP] Japan .................................. 63-22844
Nov. 24, 1988 [JP] Japan .................................. 63-297966

[51] Int. Cl.$^4$ .................. H01M 8/18; C25B 1/26; C25C 1/24
[52] U.S. Cl. ................................. 204/94; 204/112; 204/113; 204/130; 423/94; 423/493; 429/107; 429/109
[58] Field of Search ............. 429/107, 109; 204/130, 204/112, 113, 94; 423/94, 493

[56] References Cited

U.S. PATENT DOCUMENTS

| 466,720 | 1/1892 | Currie | 204/94 |
| 984,525 | 2/1911 | Barstow | 204/94 |
| 4,576,878 | 3/1986 | Gahn | 429/15 |

FOREIGN PATENT DOCUMENTS 60-115174  6/1985  Japan .

Primary Examiner—G. L. Kaplan
Attorney, Agent, or Firm—Lorusso & Loud

[57] ABSTRACT

A redox battery electrolyte is prepared from a chromium and/or iron base raw material containing nickel as impurities by dissolving the raw material in a hydrochloric acid-containing aqueous liquid to form a solution containing chromium ions and/or iron ions and nickel ions, the resulting solution being subjected to a cathodic reduction in the presence of lead ions until the electric potential thereof becomes lower than −0.6 V vs. saturated calomel electrode, thereby to remove the nickel ions therefrom.

10 Claims, 1 Drawing Sheet

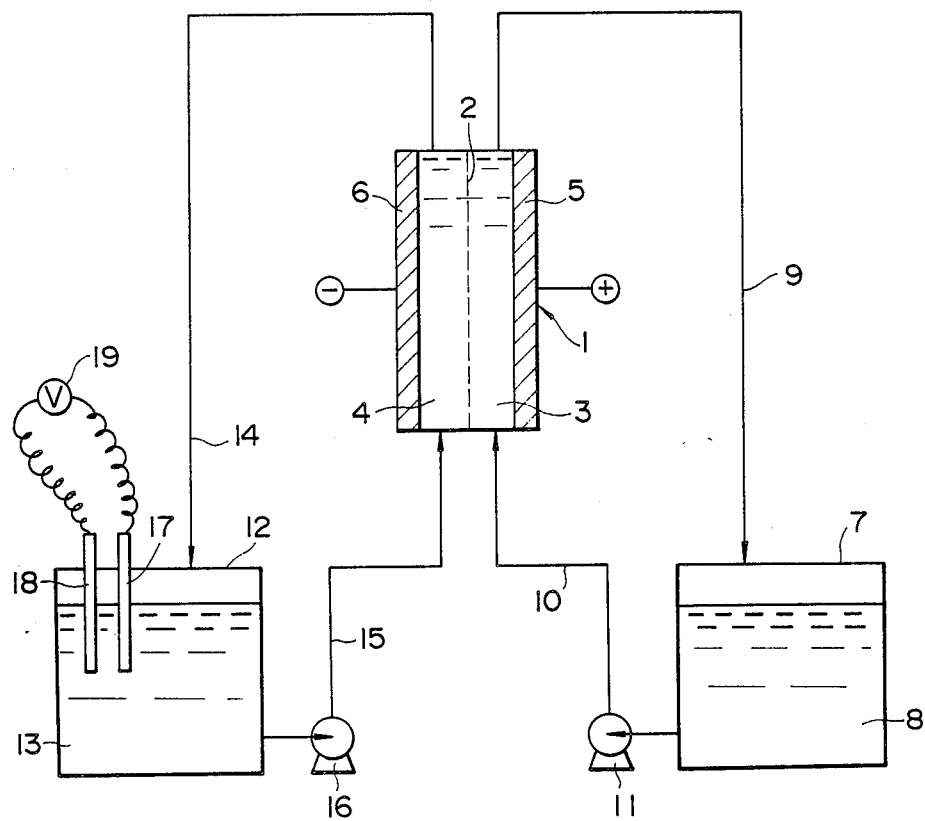

PROCESS FOR THE PREPARATION OF REDOX BATTERY ELECTROLYTE AND RECOVERY OF LEAD CHLORIDE

BACKGROUND OF THE INVENTION

This invention relates generally to a method of preparing a redox battery electrolyte containing chromium ion and/or iron ion.

There is an increasing demand for an electric power storage system and redox batteries are now attractive for such an energy storage. One known redox-flow type battery includes positive and negative electrodes disposed respectively in positive and negative electrode compartments separated by an ion exchange membrane. An electrolyte is contained in each compartment and recirculated by a pump. When, for example, iron ion-containing aqueous hydrochloric acid solution and chromium ion-containing aqueous hydrochloric acid solution are used as positive and negative side electrolytes, respectively, the following redox reactions occur:

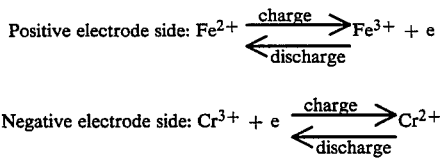

During nighttime, surplus electric power is subjected to AC—DC conversion by an inverter and the resulting direct current is used to cause the above reactions to proceed in the charge directions, so that the electric power is stored in the battery. During daytime, on the other hand, the above reactions are allowed to proceed in the discharge directions and the discharged electric energy is supplied to a power supplying system after being subjected to DC—AC conversion in the inverter.

In such a redox battery, it is important that the content of impurity metal content in the electrolytes should be minimized in order to suppress the occurrence of side reactions in the negative electrode which result in the formation of hydrogen gas and which adversely affects the coulomb efficiency of the battery. While the use of a high purity raw material such as high grade metallic iron, high grade metallic chromium or high grade chromic acid can suppress such hydrogen gas forming reactions, they are too expensive to be used in redox batteries on a commercial scale.

Japanese published unexamined patent application (Tokkyo Kokai) No. 60-115,174 suggests a method of preparing an electrolyte for use in redox flow batteries from an inexpensive raw material such as chrome minerals, chromite or ferrochrome. This method includes the steps of dissolving the raw material in an acid solution containing hydrogen chloride, introducing the resulting solution into a cathode compartment of an electrolytic cell, and subjecting the solution in the compartment to electrolysis to cause heavy metals contained therein to deposit on the electrode. In the specific working example, the electrolysis is performed with an electric potential of +0.05 V vs saturated calomel electrode (hereinafter referred to as SCE for brevity).

An electrolyte obtained by the prior art method, however, has been found still to cause lowering of the coulomb efficiency of the redox battery upon repeated use.

SUMMARY OF THE INVENTION

In accordance with the present invention there is provided an improved process for the preparation of a redox flow battery electrolyte, which comprises dissolving a raw material containing sources of chromium ions and/or iron ions and nickel ions in a hydrochloric acid-containing aqueous liquid to form a solution containing chromium ions and/or iron ions and nickel ions, and subjecting the solution to electrolytic reduction in a cathode compartment of an electrolytic cell. The improvement involves the electrolysis step which is performed in the presence of lead ions and is continued until the electric potential of the solution becomes lower than $-0.6$ V vs. SCE to cause the nickel ions to deposit on the cathode.

In another aspect, the present invention provides a method of treating an aquous hydrochloric acid solution containing iron and/or chromium ions and nickel ions for the removal of the nickel ions therefrom, which comprises subjecting the solution to cathodic reduction in the presence of lead ions to cause the nickel ions to deposit on the cathode. The cathodic reduction is preferably continued until the electric potential of the solution becomes lower than $-0.6$ V vs. SCE.

The present inventors have found that the nickel ions contained, in an amount of generally about 100-400 ppm, in redox battery electrolytes obtained from inexpensive raw materials are responsible for the lowering of the coulomb efficiency of the redox batteries and that the nickel ions can be effectively removed by cathodic reduction of the electrolytes when lead ions are present and when the cathodic reduction is continued until the electric potential of the electrolytes is lowered to a specific level.

It is, therefore, an object of the present invention to provide an economical process capable of producing, from an inexpensive raw material containing chromium and/or iron and nickel, a redox battery electrolyte which has such an extremely reduced nickel content that the coulomb efficiency of the redox flow battery using same remains unchanged upon repeated use for a long period of time.

Another object of the present invention is to provide a method of removing nickel ions from an aqueous hydrochloric acid solution containing nickel and iron-/and or chromium ions.

BRIEF DESCRIPTION OF THE DRAWING

Other objects, features and advantages of the present invention will become apparent from the detailed description of the invention to follow when considered in light of the accompanying drawing, in which:

the sole FIGURE is a schematic illustration of an electrolytic cell suitable for carrying out the process of the present invention.

DETAILED DESCRIPTION OF THE INVENTION

Raw material which contains sources of chromium and/or iron ions and nickel ions and which is to be used for the preparation of a redox battery electrolyte is desirably one that is available at low costs. Illustrative of suitable raw materials are chrome ores, partially reduced chrome ores, ferrochrome, iron and carbon steel. The partially reduced chrome ores are those which are obtained by reducing a chrome ore with a carbonaceous material to a degree providing a reduction ratio of about 50% and which contain about 10-20% of metallic chromium.

The kind of the raw material to be used is selected according to the intended composition of the redox battery electrolyte. For example, when a negative electrolyte containing chromium chloride as an active ingredient is intended to be prepared, a raw material mainly containing a source of chromium ions is used. Similarly, when a positive electrolyte containing iron chloride as an active ingredient is intended to be prepared, a raw material to be used contains iron as a major component. When an electrolyte which is commonly used in both negative and positive electrolytes (a mix reactant type redox battery) is intended, two or more raw materials are used in combination so that the chromium and iron are contained in the mixed raw materials in an equimolar amount.

The raw material is dissolved in a hydrochloric acid-containing aqueous liquid to form a solution containing chromium ions and/or iron ions and nickel ions. The aqueous liquid may be, for example, hydrochloric acid or a mixture of hydrochloric acid and one or more other acids such as sulfuric acid and hydrobromic acid. Pulverizing, stirring and/or heating may be suitably adopted for facilitating the dissolution of the raw material. Undissolved residues, if any, such as carbon and silica are then removed by, for example, filtration.

The solution thus obtained generally contains 100-400 ppm of nickel ions in addition to chromium and/or iron ions. The nickel ions will deposit as metallic nickel on a negative electrode when the solution is used as such as an electrolyte of a redox-flow battery. The deposits of nickel which has a low hydrogen evolution supervoltage serve to accelerate side reactions resulting in the evolution of hydrogen gas, thus lowering the coulomb efficiency of the redox battery. In addition, since the reactions in the positive electrode side proceed with a coulomb efficiency of about 100%, the positive electrolyte will be supercharged during repeated charging and discharging unless a large amount of the positive electrolyte is subjected to a reduction treatment in other system (rebalance cell) than the redox battery system.

The term "coulomb efficiency" used in the present specification is defined as follows:

$$\text{Coulomb efficiency} = \frac{E_D \text{ (coulomb)}}{E_C \text{ (coulomb)}} \times 100(\%)$$

where $E_D$ represents a quantity of electricity discharged in the redox battery and $E_C$ represents a quantity of electricity required to charge the redox battery.

In the process of the present invention, the above-described solution is thus subjected to an electrolytic reduction in a cathode compartment of an electrolytic cell in the presence of lead ions until the electric potential of the solution becomes lower than −0.6 V vs. SCE, thereby to cause the nickel ions to deposit on the cathode together with the lead ions. The electrolysis may be performed by constant current electrolysis, constant voltage electrolysis or a combination of the two electrolysis methods.

Since the above-described raw materials are substantially free of sources of lead ions, metallic lead or a lead compound, preferably lead chloride, is added to the solution to be treated. The content of the lead ions in the solution to be treated is preferably at least about two moles per mole of the nickel ions contained therein but below the saturation point.

The electrode to be disposed in the cathode compartment is made of a material having a high hydrogen evolution supervoltage and may be, for example, a metal electrode such as a lead electrode or a carbon electrode such as a graphite plate electrode.

The electrolysis may be suitably effected using an apparatus schematically shown in the FIGURE, in which designated generally as 1 is an electrolytic cell whose inside space is divided by a separator 2 such as an ion-exchange membrane into anode and cathode compartments 3 and 4. An anode 5 and a cathode 6 are disposed in the compartments 3 and 4, respectively. The anode compartment 3 is in flow communication with a first tank 7 containing an anolyte 8 by circulating conduits 9 and 10. A pump 11 is provided in the conduit 10 so that the electrolyte 8 is recirculated between the compartment 3 and the first tank 7. Similarly, the cathode compartment 4 is in flow communication with a second tank 12 containing a catholyte 13 by circulating conduits 14 and 15. A pump 16 is provided in the conduit 15 so that the electrolyte 13 is recirculated between the compartment 4 and the second tank 12. To monitor the electric potential of the catholyte 13, a potential-measuring electrode 17 and a saturated calomel electrode 18 are disposed in the tank 12. The electric potential of the electrolyte 13 relative to the saturated calomel electrode 18 is measured by a potentiometer 19.

The electrolysis may be conducted by a constant electric-current or a controlled potential electrolysis. It is important that the electrolysis be performed under conditions so that the electric potential of the solution is decreased to −0.6 V or less vs. SCE. When the solution to be electrolyzed has no or little amount of iron, the electrolysis is preferably conducted so that the electric potential of the solution becomes −0.65 V or less, more preferably −0.7 V or less vs. SCE. The solution to be electrolyzed generally has an initial electric potential of −0.2 to +0.1 V vs. SCE.

During the course of the electrolysis, the nickel ions in the solution are reduced and deposit on the cathode as metallic nickel. Simultaneously, lead ions deposit on the same electrode. Thus, the nickel which has deposited on the electrode is covered with the metallic lead having a higher hydrogen evolution supervoltage than nickel. Therefore, the nickel ions are caused to deposit on the cathode with minimized formation of hydrogen gas, enabling the removal of the nickel ions from the solution. In the process according to the present invention, the amount of nickel ions may be reduced to 10 ppm or less, especially 5 ppm or less. In the absence of the lead ions, hydrogen gas is formed in a large amount and it is impossible to reduce the electric potential of the solution to −0.6 V or less vs. SCE. In other words, the presence of lead ions is essential in order to reduce the amount of nickel ions to 10 ppm or less.

The solution which has undergone the above cathodic reduction treatment may be suitably used as a redox battery electrolyte. The majority of chromium ions in the thus treated solution exist as chromous ions and the iron ions are present as ferrous ions. The treated solution obtained from the raw material solution containing an equimolar amount of iron and chromium ions can be used for a mix reactant type redox flow battery after converting the crhomous ions into chromic ions by oxidation with air or by electrolysis. When the raw material solution mainly containing chromium ion is used, the treated solution is oxidized with air to convert chromous into chromic ions and the resulting solution can be suitably used as a negative electrolyte for a redox battery.

The electrolysis in the process according to the present invention is performed using a hydrochloric acid solution or a sulfuric acid solution as an anolyte. The former electrolyte produces chlorine gas and the latter electrolyte produces oxygen gas as a result of anodic oxidation reaction.

The solution which is obtained in the above-described cathodic reduction and from which the nickel has been removed may also be suitably used as the anolyte. Thus, the solution obtained in the cathode compartment is recovered and at least a portion of the recovered solution is recycled to the anode compartment as at least a portion of the anolyte. In this case, since the anolyte contains chromous and/or ferrous ions, the electrolysis can be performed at a lower voltage than in a case where the anodic oxidation involves the formation of chlorine or oxygen gas. Moreover, since the chromous ions and ferrous ions contained in the electrolyte are converted into trivalent forms when used as the anolyte, the resulting solution can be also used as an electrolyte of a redox battery. Thus, for example, the solution containing both chromic and ferric ions is subjected to an extraction with any known ferric chloride extractant such as methyl ethyl ketone or methyl isobutyl ketone, followed by a back extraction with water, so that there are obtained a solution containing chromic ions and a solution containing ferric ions. The former solution can be used as such as a negative electrolyte for a redox battery such as of a Cr/Fe, Cr/Cl$_2$ or Cr/Br$_2$ type. The latter solution may be used, after a suitable reduction treatment, as a positive electrolyte for a redox battery such as of a Cr/Fe or Ti/Fe type.

As described previously, the nickel ions and lead ions contained in the solution deposit on the cathode as a result of the electrolysis. These deposits may be removed from the electrode by a method including the steps of:

after the electrolysis, discharging the solution from the cathode compartment for recovery;

then introducing a cleaning liquid into the cathode compartment to dissolve the deposits on the cathode to obtain a liquor containing lead and nickel ions; and discharging the liquor from the cathode compartment.

The cleaning liquid may be an aqueous solution containing ferric chloride and, in this case, the cathode to which nickel and lead have deposited is washed with the ferric chloride-containing solution as follows:

$$2Fe^{3+} + Ni \longrightarrow 2Fe^{2+} + Ni^{2+}$$

$$2Fe^{3+} + Pb \longrightarrow 2Fe^{2+} + Pb^{2+}$$

The concentration of ferric ions in the cleaning liquid decreases as the dissolution of the deposits proceeds. Thus, it is advisable to occasionally add a suitable oxidizing agent such as hydrogen peroxide to the cleaning liquid or to occasionally subject the consumed cleaning liquid to anodic oxidation so as to convert the ferrous ions into ferric ions and to maintain the concentration of ferric ions in the cleaning liquid above a certain level.

Alternatively, the cleaning liquid may be hydrochloric acid. In this case, the cathode on which nickel and lead have deposited is subjected to anodic oxidation in the hydrochloric acid as follows:

$$Ni \longrightarrow Ni^{2+} + 2e$$

$$Pb \longrightarrow Pb^{2+} + 2e$$

The thus regenerated cathode can be again used for the cathodic reduction according to the present invention. On the other hand, the used cleaning liquid containing nickel ions and lead ions may be subjected to a treatment for the recovery of the lead ions as lead chloride. Since lead chloride has a smaller solubility than nickel chloride, the lead ions can be easily separated as lead chloride precipitates from the used cleaning liquid. The lead chloride thus recovered by, for example, filtration may be reused as such or after washing for the cathodic reduction of the nickel-containing solution according to the present invention.

The following examples will further illustrate the present invention.

EXAMPLE 1

Ferrochrome was dissolved in 8N hydrochloric acid with heating and the solution was filtered to remove undissolved solids. The atomic absorption spectrometry revealed that the solution (referred to as Solution (A)) has a chromium content of 1.0 mole per liter, an iron content of 0.45 mole per liter and a nickel content of 230 ppm. The hydrochloric acid concentration of Solution (A) was about 4N. In Solution (A) was dissolved lead chloride to obtain Solution (B) having a lead concentration of 0.02 mole per liter.

Solution (B) was then subjected to a cathodic reduction treatment using a lead electrode as the cathode at an electric current density of 20 mA/cm$^2$. The cathodic reduction was continued until the electric potential of the solution became $-0.7$ V vs. SCE. The atomic absorption spectrometry showed that the nickel content of the thus treated solution was decreased to 0.5 ppm.

The treated solution was then oxidized with air to obtain an electrolyte solution containing chromic ions and ferrous ions. The electrolyte solution was tested for its energy efficiency using a liquid-flow type cell including glassy carbon plates as positive and negative current collectors, carbon clothes as positive and negative electrodes, and a cation-exchange membrane disposed therebetween as a separator. Each electrode had a geometric area of 15 cm$^2$. The electrolyte solution (255 ml) was used as a circulating, negative electrolyte, while a 4N hydrochloric acid solution (255 ml, battery capacity of about 8 hours) containing 1 mole per liter of ferrous chloride was used as a circulating, positive electrolyte. For the purpose of preventing supercharge of the positive electrolyte, a portion thereof was fed to another cell (rebalance cell) and subjected there to a cathodic reduction treatment so that ferric ions produced in situ were reduced to ferrous ions in an amount corresponding to the amount of the hydrogen produced in the negative electrode.

The redox-flow battery thus constructed was operated at 40° C. with an electric current of 0.6A while repeating the alternate charging and discharging operations with the degree of charging being changed, in each charging and discharging operation, between 85% and 15% based on the fully charged state. As a result, the coulomb efficiency and the voltage efficiency were found to be 98.3% and 88%, respectively, in the second charging and discharging operation, 98.1% and 87.2%, respectively, in the 50th charging and discharging operation, and 98.6% and 86.8%, respectively, in the 100th charging and discharging operation. The term "voltage efficiency" is intended to refer to:

$$\text{Voltage efficiency (\%)} = \frac{\text{Discharging voltage (V)}}{\text{Charging voltage (V)}} \times 100$$

COMPARATIVE EXAMPLE 1

A redox battery was constructed in the same manner as that in Example 1 except that Solution (A) obtained in Example 1 was used as the negative electrolyte. The coulomb efficiency and voltage efficiency in the second charging and discharge operation were 45% and 86%, respectively.

COMPARATIVE EXAMPLE 2

Solution (A) obtained in Example 1 was subjected to a cathodic reduction treatment at a electric current density of 20 mA/cm$^2$ using a carbon cloth as the cathode with a quantity of electricity sufficient to theoretically convert all the chromium ions contained in Solution (A) into the divalent form. Hydrogen gas was generated significantly during the cathodic reduction treatment. The resulting solution contained 190 ppm of nickel ions (determined by atomic absorption spectrometry) and had an electric potential of −0.55 V vs. SCE.

The treated solution was then oxidized with air to obtain an electrolyte containing chromic ions and ferrous ions. The electrolyte was tested for its energy efficiency using a liquid type cell having the same construction as that used in Example 1. Thus the electrolyte (9 ml, battery capacity of about 17 min.) was used as a negative electrolyte while a 4N hydrochloric acid solution (300 ml) containing 0.5 mole per liter of ferrous chloride and 0.5 mole per liter of ferric chloride was used as a circulating, positive electrolyte. The redox battery was operated at 40° C. with an electric current of 0.6A while repeating the alternate charging and discharging operations with the degree of charging being changed, in each operation, between 85% and 0% based on the fully charged state. As a result, the coulomb efficiency and the voltage efficiency were found to be 96.8% and 87.5%, respectively, in the second charging and discharging operation, 85.8% and 85.7%, respectively, in the 50th charging and discharging operation, and 80.2% and 84.3%, respectively, in the 100th charging and discharging operation.

Further, the above electrolyte (255 ml) was tested in the same manner as Example 1. The coulomb efficiency and the voltage efficiency were found to be 50% and 87.5%, respectively, in the second charging and discharging operation.

EXAMPLE 2

Partially reduced chrome ore pellets were dissolved in 9N hydrochloric acid with heating and the solution was filtered to remove undissolved solids. The atomic absorption spectrometry revealed that the solution had a chromium content of 1.1 mole per liter, an iron content of 0.82 mole per liter and a nickel content of 270 ppm. The hydrochloric acid concentration of the solution was about 4N. In the solution was dissolved metallic lead to obtain a solution having a lead concentration of 0.03 mole per liter.

This solution was then subjected to a cathodic reduction treatment using a lead electrode as the cathode at an electric current density of 30 mA/cm$^2$. The cathodic reduction was continued until the electric potential of the solution became −0.7 V vs. SCE. The atomic absorption spectrometry showed that the nickel content of the thus treared solution was decreased to 0.3 ppm.

The treated solution was then introduced into an anode compartment of the electrolytic cell used in the above cathodic reduction and was subjected to anodic oxidization to obtain an electrolyte solution containing chromic ions and ferrous ions. The electrolyte solution (230 ml) was tested for its energy efficiency in the same manner as that in Example 1. As a result, the coulomb efficiency and the voltage efficiency were found to be 98.5% and 87.5%, respectively, in the second charging and discharging operation, and 98.6% and 85.6%, respectively, in the 100th charging and discharging operation.

EXAMPLE 3

Ground chrome ore was dissolved in 10N hydrochloric acid with heating and the solution was filtered to remove undissolved solids. The atomic absorption spectrometry revealed that the solution had a chromium content of 0.95 mole per liter, an iron content of 0.6 mole per liter and a nickel content of 230 ppm. The hydrochloric acid concentration of the solution was about 4N. In the solution was dissolved lead chloride to obtain a solution having a lead concentration of 0.02 mole per liter.

This solution was then subjected to a cathodic reduction treatment using a carbon plate electrode as the cathode at an electric current density of 20 mA/cm$^2$. The cathodic reduction was continued until the electric potential of the solution became −0.7 V vs SCE. The atomic absorption spectrometry showed that the nickel content of the thus treated solution was descreased to 1.2 ppm.

The treated solution was oxidized with air to obtain an electrolyte solution containing chromic ions and ferrous ions. The electrolyte solution (270 ml) was tested for its energy efficiency in the same manner as that in Example 1. As a result, the coulomb efficiency and the voltage efficiency were found to be 98.0% and 87.8%, respectively, in the second charging and discharging operation, and 98.2% and 85.8%, respectively, in the 100th charging and discharging operation.

EXAMPLE 4

Solution (B) obtained in Example 1 was subjected to a cathodic reduction treatment using a graphite electrode as the cathode at an electric current density of 15 mA/cm$^2$. The cathodic reduction was continued until the electric potential of the solution became −0.7 V vs. SCE. The atomic absorption spectrometry showed that the nickel content of the thus treated solution was decreased to 1.5 ppm.

The treated solution was oxidized with air to obtain an electrolyte solution containing chromic ions and ferrous ions. The electrolyte solution (255 ml) was tested for its energy efficiency in the same manner as that in Example 1. As a result, the coulomb efficiency and the voltage efficiency were found to be 97.8% and 87.8%, respectively, in the second charging and discharging operation, and 98.1% and 86.7%, respectively, in the 100th charging and discharging operation.

EXAMPLE 5

Ferrochrome (2,300 g) and carbon steel SS-14 (650 g) were dissolved in 10N hydrochloric acid and the solution was filtered to remove undissolved solids. The atomic absorption spectrometry revealed that the filtrate had a chromium content of 1.2 mole per liter, an iron content of 1.2 mole per liter and a nickel content of 340 ppm. The hydrochloric acid concentration of the filtrate was about 4N. This filtrate (about 20 liters) was used in the following tests as a stock solution.

Into the stock solution (1 liter) was dissolved lead chloride in an amount providing a lead concentration of 0.05 mole per liter. The resulting solution was then subjected to a cathodic reduction treatment using a glassy carbon plate as the cathode at an electric current density of 30 mA/cm$^2$. The cathodic reduction was continued until the electric potential of the solution became $-0.65$ V vs. SCE. The atomic absorption spectrometry showed that the nickel content of the thus treated solution was decreased to 0.4 ppm.

After the completion of the cathodic reduction, the treated solution was recovered and a cleaning liquid (2 liters) which was a 4N hydrochloric acid solution containing 1 mole per liter of ferric chloride was fed to the cathode chamber for washing the cathode with the cleaning liquid. The cleaning liquid after the washing contained 170 ppm of nickel and 0.025 mole per liter of lead, indicating that substantially all the nickel and lead deposits on the cathode were able to be recovered. The resulting cathode chamber and the cathode was washed with water.

Into another 1 liter of the stock solution was dissolved lead chloride to obtain a solution containing 0.05 mole per liter of lead chloride. Using the above washed cathode, the solution was subjected to cathodic reduction in the same manner as above and the resulting cathode was washed in the same manner as above.

Such an operation consisting of cathodic reduction and succeeding wash was repeated eight more times, i.e. a total of 10 times operations, in the same manner as above. Precipitates of lead chloride were formed in the cleaning liquids obtained after the wash in the third, to tenth operations and were separated by filtration. The amount of the lead chloride thus recovered was 0.005 mole on the third operation, 0.05 mole in the fourth operation, 0.049 in the fifth operation and 0.05 mole in the succeeding sixth to tenth operations, indicating that the lead chloride was quantitatively recovered. The lead chloride precipitates thus recovered in the fifth to ninth operations were used in the sixth to tenth operations, respectively.

The solutions obtained as a result of the cathodic reduction in the second to tenth operations were found to have a nickel content of in the range of 0.3–0.7 ppm. All of these solutions obtained in the first to tenth operations were combined to obtain about 10 liters of a treated solution having a chromium content of 1.15 mole per liter, an iron content of 1.15 mole per liter and a nickel content of 0.5 ppm.

This combined solution was oxidized with air to obtain an electrolyte solution containing chromic ions and ferrous ions. The electrolyte solution was tested for its energy efficiency in the same manner as that in Example 1 except that the above electrolyte solution (222 ml each) was used as the negative electrolyte and the positive electrolyte. As a result, the coulomb efficiency and the voltage efficiency were found to be 98.4% and 87.8%, respectively, in the second charging and discharging operation, 98.3% and 87.4%, respectively, in the 50th charging and discharging operation, and 98.6% and 87%, respectively, in the 100th charging and discharging operation.

COMPARATIVE EXAMLE 3

A redox battery was constructed in the same manner as that in Example 5 except that stock solution was used as such as the negative electrolyte. The coulomb efficiency and voltage efficiency in the second charging and discharge operation were 41% and 86.5%, respectively.

COMPARATIVE EXAMPLE 4

The stock solution obtained in Example 5 was subjected to a cathodic reduction treatment at a electric current density of 30 mA/cm$^2$ using a glassy carbon plate as the cathode with a quantity of electricity sufficient to theoretically convert all the chromic ions contained in stock solution into the divalent form. Hydrogen gas was generated significantly during the cathodic reduction treatment. The electric potential of the solution was found to decrease at an early stage of the cathodic reduction but remained unchanged after it reached $-0.53$ V vs. SCE The resulting solution was found to contain 280 ppm of nickel when determined by atomic absorption spectrometry.

The treated solution was then oxidized with air to obtain an electrolyte containing chromic ions and ferrous ions. The electrolyte was tested for its energy efficiency in the same manner as that in Example 5. As a result, the coulomb efficiency and the voltage efficiency were found to be 45% and 86.6%, respectively, in the second charging and discharging operation.

EXAMPLE 6

Into the stock solution (1 liter) obtained in Example 5 was dissolved lead chloride in an amount providing a lead concentration of 0.06 mole per liter. The resulting solution was then subjected to a cathodic reduction treatment in an electrolytic cell using a glassy carbon plate as the cathode at an electric current density of 30 mA/cm$^2$. A 5N hydrochloric acid solution (2 liters) containing 1 mole per liter of ferrous chloride was circulated into the anode compartment. The cathodic reduction was continued until the electric potential of the solution became $-0.65$ V vs. SCE.

After the completion of the cathodic reduction, the treated solution was recovered from the cathode compartment and the liquid in the anode chamber was also recovered. The atomic absorption spectrometry showed that the nickel content of the thus treated solution was decreased to 0.3 ppm. The liquid recovered from the anode compartment had a ferrous chloride concentration of 0.25 mole per liter, a ferric chloride concentration of 0.75 mole per liter and a hydrochloric acid concentration of about 4.3N.

The liquid recovered from the anode compartment was fed, as a cleaning liquid, to the cathode compartment of the above electrolytic cell for washing the cathode therewith. The cleaning liquid after the wash contained 170 ppm of nickel and 0.03 mole per liter of lead, indicating that substantially all the nickel and lead which had deposited on the cathode were able to be recovered. The cleaning liquid was repeatedly used for washing the cathode in the succeeding operations. The resulting cathode chamber and the cathode were washed with water.

Into another 1 liter of the stock solution was dissolved lead chloride to obtain a solution containing 0.06 mole per liter of lead chloride. Using the above washed cathode, the solution was subjected to cathodic reduction in the same manner as above except that the treated solution obtained as a result of the previous cathodic reduction was used as the anode side electrolyte. After the completion of the cathodic reduction, the treated solution was recovered from the cathode compartment and the liquid in the anode chamber was also recovered. The atomic absorption analysis showed that the nickel content of the thus treated solution was decreased to 0.2 ppm. The liquid recovered from the anode compartment had a ferrous chloride concentration of 0.6 mole per liter, a ferric chloride concentration of 0.62 mole per liter and a chromic chloride concentration of 1.22 mole per liter. The cathode chamber was then washed with the above-mentioned cleaning liquid and then with water.

Such an operation consisting of cathodic reduction and succeeding wash was repeated three more times, i.e. a total of 5 times operations, in the same manner as above. Precipitates of lead chloride formed in the cleaning liquids obtained after each wash were separated by filtration and reused for incorporation into the stock solution.

The solutions recovered from the anode chamber in the second to fifth operations were combined to obtain about 4 liters of a solution having a ferrous chloride concentration of 0.59 mole per liter, a ferric chloride concentration of 0.61 mole per liter, a chromic chloride concentration of 1.2 mole per liter, a nickel content of 0.3 ppm and a hydrochloric acid concentration of about 4N.

This combined solution was subjected to a cathodic reduction to convert ferric chloride into ferrous chloride. The resulting electrolyte solution (217 ml) was tested for its energy efficiency in the same manner as that in Example 5. As a result, the coulomb efficiency and the voltage efficiency were found to be 98.5% and 87.7%, respectively, in the second charging and discharging operation, 98.7% and 87.5%, respectively, in the 50th charging and discharging operation, and 98.6% and 87.3%, respectively, in the 100th charging and discharging operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the preparation of a redox battery electrolyte, comprising the steps of:
   (a) dissolving a raw material containing sources of chromium ions and/or iron ions and nickel ions in a hydrochloric acid-containing aqueous liquid to form a solution containing chromium ions and/or iron ions and nickel ions; and
   (b) subjecting the solution to an electrolytic reduction in a cathode compartment in the presence of lead ions until the electric potential of the solution becomes lower than $-0.6$ V vs. saturated calomel electrode, thereby to cause the nickel ions to deposit on the cathode together with the lead ions.

2. A process according to claim 1, further comprising the steps of:
   (c) after step (b), discharging the solution from the cathode compartment for recovery;
   (d) then introducing a cleaning liquid into the cathode compartment to dissolve the deposits on the cathode to obtain a liquor containing lead and nickel ions;
   (e) discharging said liquor from the cathode compartment; and
   (f) recovering the lead ions as lead chloride.

3. A process according to claim 2, wherein said cleaning liquid is an aqueous solution containing ferric chloride and wherein step (d) includes washing the cathode to which nickel and lead have deposited with said ferric chloride-containing solution.

4. A process according to claim 2, wherein said cleaning liquid is hydrochloric acid and wherein step (d) includes subjecting the cathode on which nickel and lead have deposited to anodic oxidation in the hydrochloric acid.

5. A process according to claim 1, further comprising recovering the solution from the cathode compartment after step (b) and recycling at least a portion of the recovered solution to the anode compartment as at least a portion of the anolyte to be used in step (b).

6. A process according to claim 1, wherein said raw material is at least one member selected from the group consisting of chrome ores, partially reduced chrome ores, ferrochrome, iron and carbon steel.

7. A process according to claim 1, wherein the cathode is a lead electrode or a carbon plate electrode.

8. A method of treating an aqueous hydrochloric acid solution containing iron ions and/or chromium ions and nickel ions for the removal of the nickel ions therefrom, comprising subjecting the solution to cathodic reduction in the presence of lead ions to cause the nickel ions to deposit on the cathode.

9. A method according to claim 8, wherein the content of the lead ions in the solution is at least two moles per mole of the nickel ions.

10. A method according to claim 8, wherein said cathodic reduction is continued until the electric potential of the solution becomes lower than $-0.6$ V vs. saturated calomel electrode.

* * * * *